United States Patent
Mathewson, II

(10) Patent No.: US 7,562,124 B2
(45) Date of Patent: Jul. 14, 2009

(54) SYSTEMS AND METHODS FOR DETERMINING COMPLETION OF BUILDING A PRESENTATION SPACE IN A TN3270 ENVIRONMENT

(75) Inventor: James M. Mathewson, II, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 10/142,128

(22) Filed: May 9, 2002

(65) Prior Publication Data

US 2003/0212751 A1    Nov. 13, 2003

(51) Int. Cl.
*G06F 13/00*    (2006.01)

(52) U.S. Cl. ..................................... 709/210

(58) Field of Classification Search ......... 709/101–231; 370/400–405; 707/101; 713/155–158
See application file for complete search history.

(56) References Cited

U.S. PATENT DOCUMENTS 5,325,361 A * 6/1994 Lederer et al. .............. 370/401
5,892,907 A * 4/1999 Harper et al. ............... 709/200
6,480,859 B2 * 11/2002 Mittal et al. ................ 707/101
6,823,452 B1 * 11/2004 Doyle et al. ................ 713/156
6,826,603 B1 * 11/2004 Giroir et al. ................ 709/220

OTHER PUBLICATIONS

Martin R., Problems management and determination in SNA subnetwork, Southeastcon 90, Proceedings, IEEE, Apr. 1-4, 1990, p. 953-958 vol. 3.*

* cited by examiner

*Primary Examiner*—Robert B Harrell
(74) *Attorney, Agent, or Firm*—A. Bruce Clay; Hoffman Warnick LLC

(57) ABSTRACT

A method, system and article of manufacture for determining whether a presentation space (PS) is completely built in a TN3270 environment. In general, a TN3270 client is provided with an indication from a TN3270 server that a Systems Network Architecture (SNA) application has completely built the PS. In some cases, the indication prompts the TN3270 client to unlock a device, such as a keyboard.

28 Claims, 4 Drawing Sheets

SYSTEMS AND METHODS FOR DETERMINING COMPLETION OF BUILDING A PRESENTATION SPACE IN A TN3270 ENVIRONMENT

BACKGROUND OF THE INVENTION

1. Field of the Invention

The present invention generally relates to data processing and more particularly to 3270 applications migrated for use on TN3270 network architecture.

2. Description of the Related Art

Data processing systems, methods and computer program products that use a 3270 data stream architecture have been widely used for decades. Systems using the 3270 data stream architecture are often referred to as "legacy" systems. Details regarding the 3270 data stream architecture are described in "IBM 3270 Information Display System Data Stream Programmer's Reference", published by International Business Machines Corporation (IBM), the assignee of the present application, IBM Publication Number GA23-0059-07, 1982, the disclosure of which is hereby incorporated herein by reference.

In general, the 3270 data stream controls the processing and formatting of data with commands, orders, control characters, attributes, and structured fields. The 3270 data stream operations are used primarily for transmitting data between a host application and a client. More specifically, the 3270 data stream architecture is used to communicate between a Primary Logical Unit (PLU) and a Secondary Logical Unit (SLU) using the LU2 protocol. The PLU typically performs functions associated with the host application. It will be understood that the primary and secondary logical units may be mainframe computers, midrange computers, personal computers, terminals, workstations or one or more computer programs that execute on one or more of such computers.

The above described environment may be further understood with reference to FIG. 1. As shown in FIG. 1, a data processing system (100) includes a PLU (110) and an SLU (120) that communicate with each other over a network (130) using the 3270 data stream. The PLU (110) may also be referred to as a host, and the SLU (120) may be referred to as a terminal, workstation, emulator or client. The SLU (120) typically includes a keyboard and a display device. The PLU (110) includes a host application (140), which communicates with the SLU (120) via the network (130). The SLU (120) includes a presentation space (PS) (180). The PS (180) is the collection of information that together comprises the information to be displayed on a screen of a terminal in the SLU, as well as the control data that conveys how and where that information is to represented. It will be understood that, although FIG. 1 illustrates a simple data processing system (100) including one PLU (110), one SLU (120) and a simple network connection (130), the 3270 data stream architecture is generally used to communicate among many PLUs and SLUs using complex network environments.

PLUs and SLUs communicate in a Systems Network Architecture (SNA). The SNA is the logical structure, formats, protocols, and operational sequences for transmitting information units through, and controlling the configuration and operation of, networks. Thus, in the context of FIG. 1, where the network (130) is a SNA network, the host application (140) is a 3270 application.

The 3270 data stream is an arrangement of bytes and can be an outbound data stream or an inbound data stream. The outbound data stream is a data stream sent from the host application (140) to the SLU (120) and includes data, a command, and if a write type command, a write control character (WCC). An inbound data stream is sent from the SLU to the host application and consists of an attention identifier (AID), followed by data. The AID is a byte that describes the action that caused the transmission of the inbound data stream. The data is the information transferred between the host application and the SLU.

The command from the host application (140) is sent to the SLU (120) to initiate the total or partial writing, reading, or erasing of portions of the PS (140). Commands are sent as a command code in the first byte of a request/response unit (RU) chain. Examples of typical command codes may be found in TABLE 1 below.

TABLE 1

| Command | EBCDIC | Local Channel non-SNA |
| --- | --- | --- |
| Write | X'F1' | X'01' |
| Erase/Write | X'F5' | X'05' |
| Erase/Write Alternate | X'7E' | X'0D' |
| Read Buffer | X'F2' | X'02' |
| Read Modified | X'F6' | X'06' |
| Read Modified All | X'6E' | N/A |
| Erase All Unprotected | X'6F' | X'0F' |
| Write Structured Field | X'F3' | X'11' |

Referring to TABLE 1, EBCDIC (Extended Binary-Coded Decimal Interchange Code) is a coded character set consisting of 8-bit coded characters. EBCDIC is the standard decimal interchange code for IBM mainframes. Local Channel non-SNA refers to a network that attaches emulators, terminals, and workstations, which may communicate with other locally attached devices without using the SNA network.

The WCC is the byte following a write command used to specify that a particular operation, or combination of operations, is to be performed at a terminal or printer. For the write command, the WCC is bit encoded with bits 0-1 set depending on the values in bits 2-7. TABLE 2 below, indicates the functions of the WCC bits.

TABLE 2

| Bit | Function |
| --- | --- |
| 0-1 | Depends on values in bits 2-7 |
| 2-3 | For printers |
| 4 | Start-printer bit |
| 5 | Sound-alarm bit |
| 6 | Keyboard restore bit |
| 7 | Reset MDT bits in the field attributes |

When bit 6 of the WCC is set to 1, the command unlocks the keyboard, and resets the AID byte.

Recently, many users have abandoned 3270 terminals in favor of personal computers (PCs). However, because most host applications on the mainframe were written to run on 3270 terminals in a SNA network, a terminal emulator that permits PCs to access an IBM mainframe was necessitated. Generally, the terminal emulator causes the PC to appear as a 3270 terminal to the mainframe. One method of doing this is with a Telnet 3270 terminal emulator (TN3270). Additional information regarding TN3270 can be found in RFC 2355.

An exemplary illustration of the relationship between a SNA network and a TN3270 network is found in FIG. 2. In FIG. 2, the data processing system (100), includes the PLU (110), including a host application (140), which communicates with the SLU (120) via the SNA network (130). In contrast to FIG. 1, the SLU (120), shown in FIG. 2, is split between two entities, a TN3270 server (150) and a TN3270 client (170), which communicate via a TN3270 network (160). The TN3270 client (170) has a PS (180) which is used to display information on a display device.

The TN3270 performs the function of modifying the display information sent by the host application (140) on the mainframe, and formatting it for display on the PC. In other words, the TN3270 manipulates the presentation space (180). In a typical attempt to modify the PS (180) on the TN3270 client (170), the host application (140) communicates the 3270 data stream via the SNA network (130), using SNA network protocols. The TN3270 server (150) receives the 3270 data stream and translates the SNA network protocols into TN3270 network protocols, leaving the payload the same, thus, creating a TN3270 data stream. As part of this processing, the TN3270 causes 3270 data streams to be encapsulated in telnet TCP/IP packets. The TN3270 server (150) then sends the TN3270 data stream to the TN3270 client (170) via the TN3270 network (160). The TN3270 client (170) receives the TN3270 data stream and updates the PS (180) with the payload.

After the host application (140) completes its modification of the PS (180), the PLU (110) sends either an end bracket (EB) or a change direction (CD) to the SLU (120) to indicate that the PLU is done updating the PS (180). The EB is sent from the PLU (110) to the TN3270 server (150), and indicates that the PLU (110) is done updating the PS (180), and that either the SLU (120) or PLU (110) may begin a communication. In particular, the EB places the session in a contention state. The contention state is when both the PLU and SLU are able to initiate a communication. In the contention state, if both the PLU and SLU simultaneously begin a conversation, the SLU will prevail. When in the contention state, the host application may send a BID or a SIGNAL to the SLU. The BID is a request to begin a communication. The SLU may accept or reject the BID. One reason for rejecting the BID is if the PS has been modified by an entity on the SLU-side, such as a user. In the case of a modification of the PS by the user, the SLU must reject the host application's BID attempt so that the SLU can report the modifications to the host application. In a typical TN3270 environment, the TN3270 server rejects all BIDs from the host application.

The SIGNAL is an SNA command that is a demand from the host application to the SLU, or vice versa, to begin a communication. If the SLU receives a SIGNAL it must allow the host application to communicate. Upon receipt of a SIGNAL, the SLU may send all changes to the PS to the host application, as well as a change direction (CD). The CD may be sent by either the PLU or SLU, and indicates that only the PLU may begin a communication, and that the SLU will not interrupt any communications.

In a pure SNA network (as shown in FIG. 1), the EB would implicitly unlock the keyboard. However, when SNA applications are migrated for use on the TN3270 network (as shown in FIG. 2), there is no implicit unlocking of the keyboard. In general practice, a well-mannered TN3270 server does not pass the EB to the TN3270 client; rather, the server generates and communicates an X'F1C2' command. An X'F1C2' command is a write command with WCC having keyboard restore bit on (i.e., bit 6). Thus, the X'F1C2' command unlocks the keyboard. The current practice of a TN3270 server is to generate and communicate to the TN3270 client an X'F1C2' upon receipt of an EB from the PLU. However, because X'F1C2' can be generated by both the TN3270 server and the host application, the TN3270 client is not explicitly aware of the EB and will not know that the host application is done updating the PS. The same is true when the TN3270 receives a CD, except that a CD does not include an implicit keyboard store.

Therefore, there is a need for determining whether the PS is completely built in a TN3270 environment.

SUMMARY OF THE INVENTION

The present invention generally provides methods, systems and articles of manufacture for determining whether a presentation space (PS) is completely built in a TN3270 environment. In general, a TN3270 client is provided with an indication from a TN3270 server that a SNA application has completely built the PS. In some cases, the indication prompts the TN3270 client to unlock a device, such as a keyboard.

One embodiment provides a method, comprising sending, from a TN3270 server to a TN3270 client, a command which unambiguously indicates to the TN3270 client that a Systems Network Architecture (SNA) application has completed building a presentation space in the T3270 client.

Another embodiment provides a method performed within an environment comprising a (i) primary logical unit (PLU) comprising a SNA host application, (ii) a secondary logical unit (SLU) and (iii) a SNA network connecting the PLU and SLU. The method comprises sending, from a TN3270 server of the SLU to a TN3270 client of the SLU, a command which unambiguously indicates to the TN3270 client that the SNA host application has completed building a presentation space of the T3270 client.

Yet another embodiment provides a secondary logical unit connected to a primary logical unit via a SNA network, comprising: a TN3270 server configured to send a command; and a TN3270 client configured to receive the command, wherein the command unambiguously indicates to the TN3270 client that a SNA host application of the PLU has finished building a presentation space of the TN3270 client.

Still another embodiment provides a system, comprising: a primary logical unit (PLU) comprising a SNA host application and a secondary logical unit (SLU) connected to the PLU by a SNA network. The SLU comprises a TN3270 server configured to send a write command; a TN3270 client configured to receive the write command, wherein the write command unambiguously indicates to the TN3270 client that the SNA host application has completed building a presentation space of the TN3270 client; and a telnet network connecting the TN3270 server and the TN3270 client.

Still another embodiment provides a method comprises sending a command from a TN3270 server to a TN3270 client when the TN3270 server receives a signal from a SNA application demanding ownership of a presentation space of the TN3270 client.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally provides methods, systems and articles of manufacture for determining whether a presentation space (PS) is completely built in a TN3270 environment. Further, embodiments are provided for defining the ownership of the presentation space by either a PLU or SLU.

Figure 1:
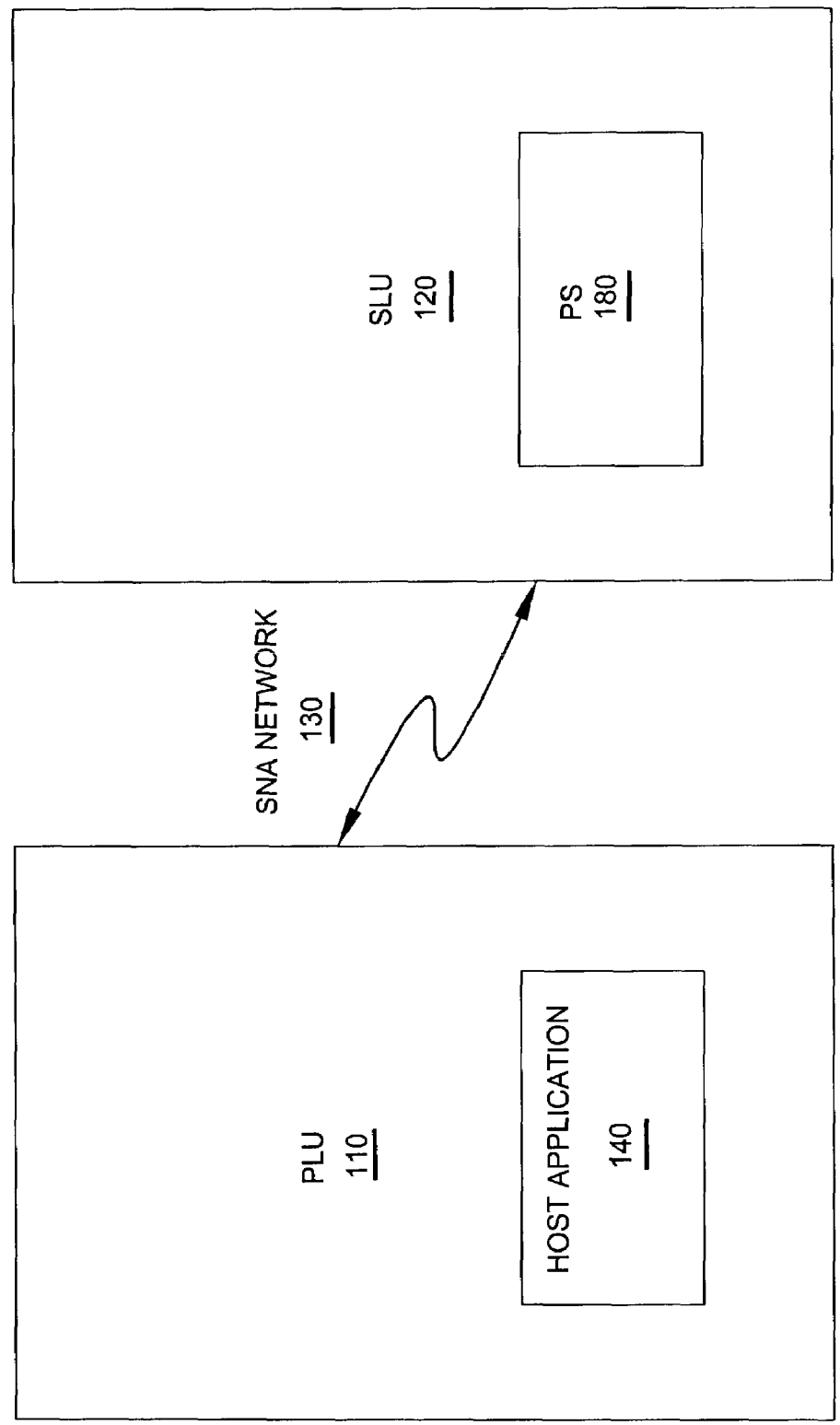
FIG. 1 illustrates a prior art pure SNA data processing system.
Figure 2:
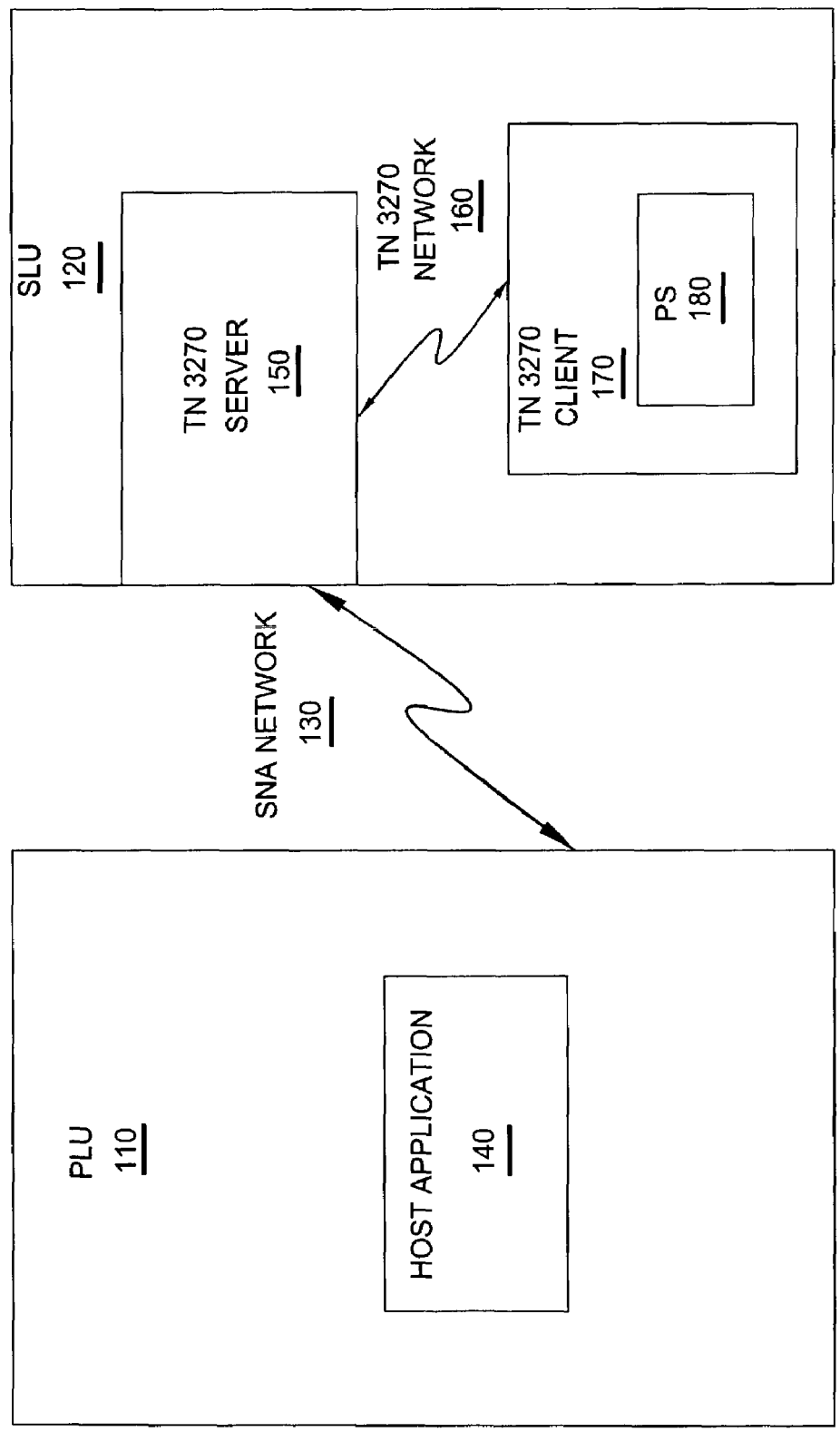
FIG. 2 is an exemplary illustration of the relationship between a SNA network and a TN3270 network.
Figure 3:
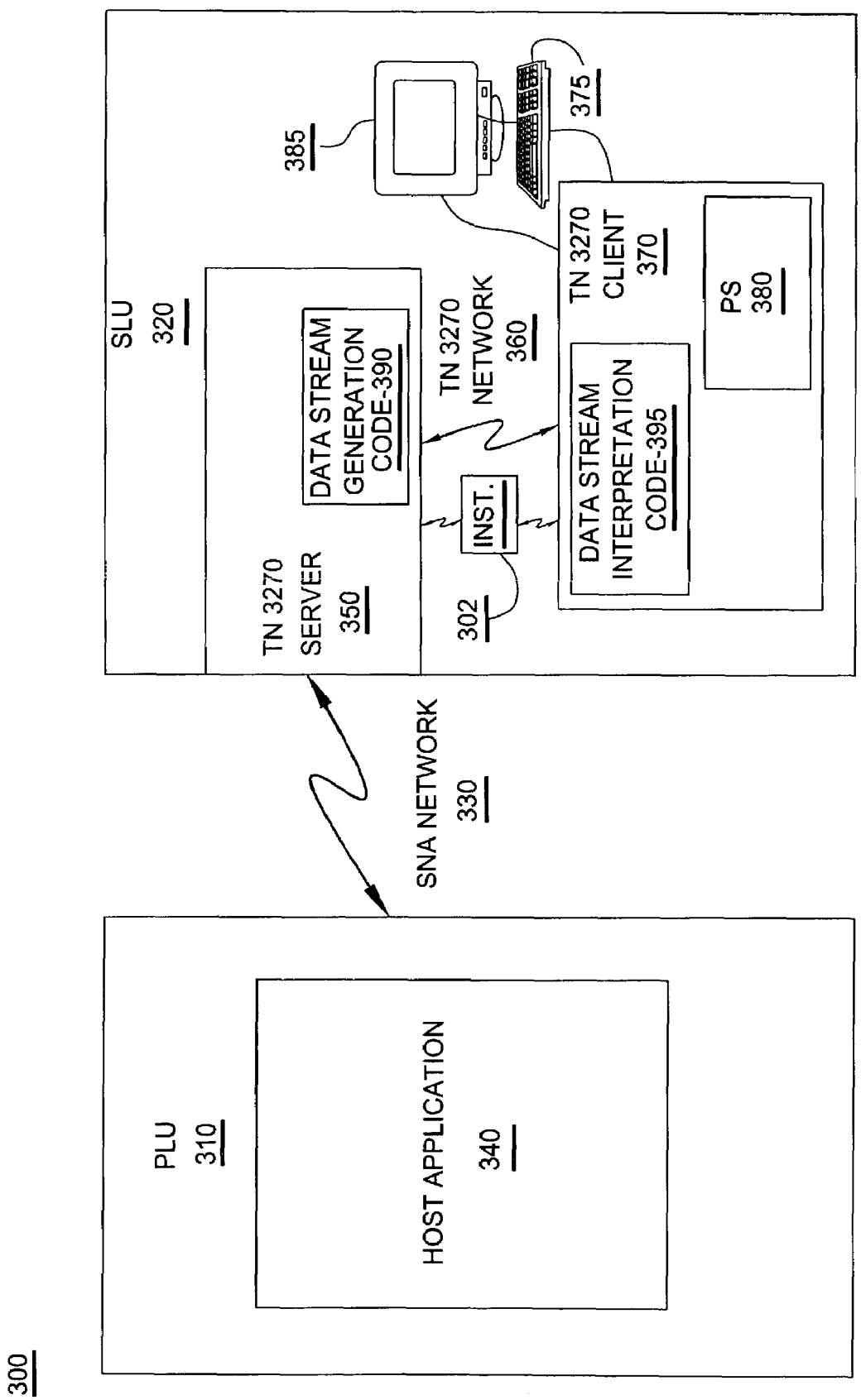
FIG. 3 illustrates one embodiment of a data processing system of the invention.

One embodiment of a data processing system (300) of the invention is shown in FIG. 3. Generally, the data processing system (300) includes a PLU (310) and an SLU (320) that communicate with each other over a SNA network (330) using the 3270 data stream. The PLU (310) includes a host application (340), which communicates with the SLU (320) via the network (330). The SLU comprises a TN3270 server (350) and a TN3270 client (370), which communicate via a TN3270 network (360). The TN3270 client (370) has a PS (380) which is used to display information on a display device (375). The PS (380) is the collection of information that together comprises the information to be displayed on a screen of a terminal (385) in the SLU, as well as the control data that conveys how and where that information is to be represented. It will be understood that, although FIG. 3 illustrates only one PLU (310) and one SLU (320) connected via the SNA network (330), the 3270 data stream architecture is generally used to communicate among many PLUs and SLUs using complex network environments.

The client (370) and server (350) of the SLU (320) are each configured to communicate information regarding the state of the PS (380). In particular, the server (350) is configured with data stream command generation code (390) and the client (370) is configured with data stream command interpretation code (395). In operation, the server (350) receives one of an EB or CD from the SNA application (340). In response, the server generates (using the data stream command generation code (390)) and transmits a command (represented as the instruction (302)) indicating to the client (370) that the host application (340) is finished building the PS (380). In this manner, the client (370) is made aware of the state of the PS (380).

In order for the TN3270 client (370) to know that the PS (380) has been completely built (i.e., one of an end bracket (EB) or a change direction (CD) has been sent by the host application (340)), the TN3270 server (350) generates a command (i.e., command 302 in FIG. 3) which unambiguously indicates to the TN3270 client that the command originated with the TN3270 server. In one embodiment, receipt of an EB from the SNA host application (340) causes the TN3270 server to generate a command having the following format: X'0102'. Where the TN 3270 server receives a CD from the SNA application, the TN3270 server generates a command having the following format: X'0100'. The X'01' command is defined as a valid local channel non-SNA write command. X'02' is a WCC having keyboard restore. In combination, the command is X'0102'. Thus, where an EB would previously cause the TN3270 server to generate an X'F1C2', which would not permit the TN3270 client to know that the PS was completely built, the TN3270 server will instead send a X'0102'. The use of X'01' as the write command unambiguously indicates that the command was generated by the TN3270 server and not the SNA host application (which would send an X'F1' instead). The use of X'02' indicates to the TN3270 client that the command could not have been sent by a local channel non-SNA application as the WCC is unique to the TN3270 server. An X'0100' can also only be generated by the TN3270 server. In this manner, the client is definitively made aware that the command originated from the TN3270 server. Upon receipt of the X'0102' the TN3270 client knows that the X'0102' must have come from the TN3270 server and the TN3270 client knows that the PS is completely built and is commanded to unlock the keyboard.

In other embodiments, the server (350) receives a SIGNAL from the SNA application 340 demanding ownership of the PS (380). In response, the server generates (using the data stream command generation code (390)) and transmits a command (represented as the instruction (302)) indicating to the client (370) that the host application (340) now has ownership of the PS (380). Upon receipt of the command 302 (sent by the server in response to the SIGNAL), the keyboard is locked.

Figure 4:
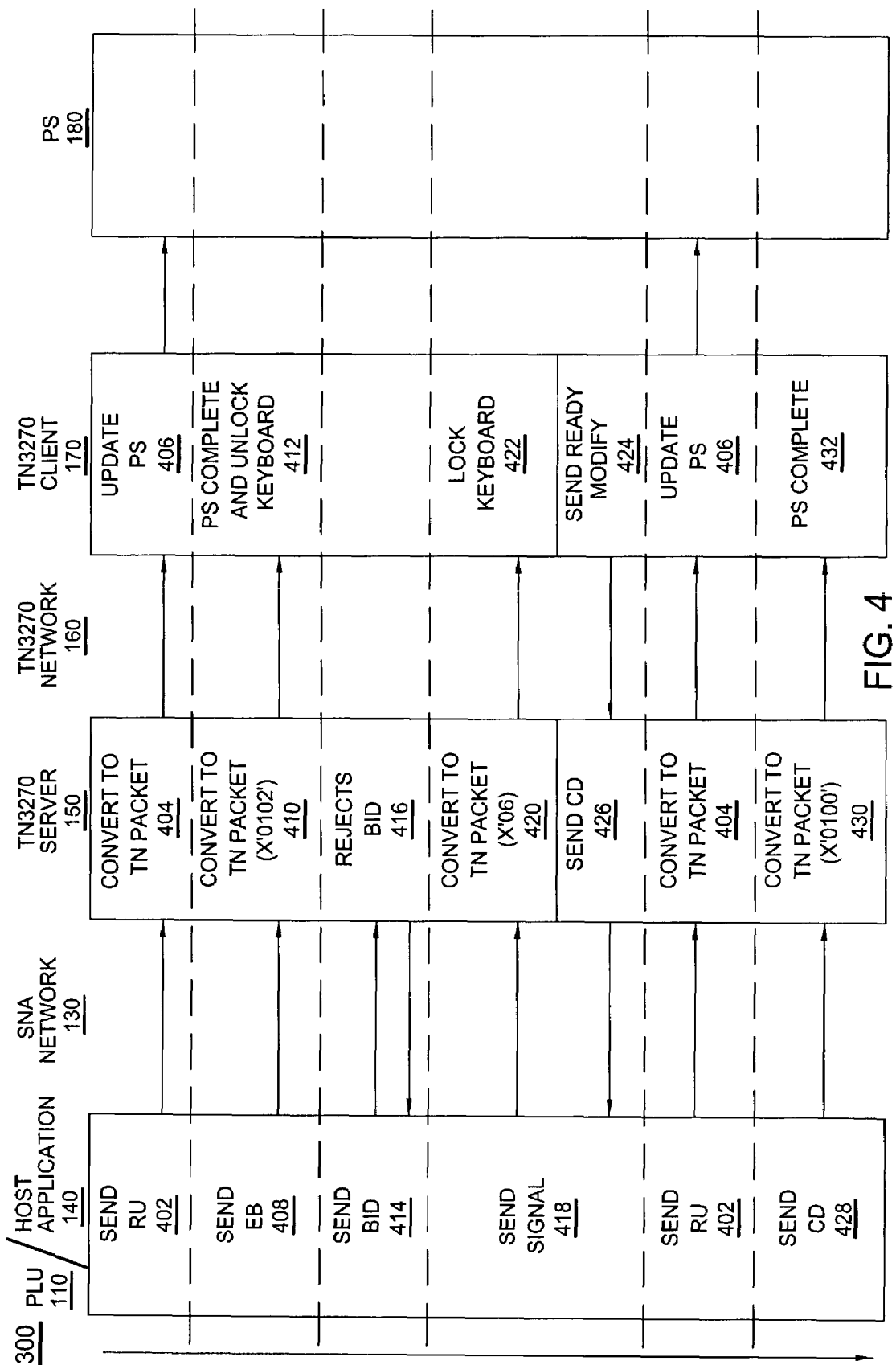
FIG. 4 illustrates an exemplary flow process of one or more embodiments of the present invention.

FIG. 4 illustrates an exemplary flow process of one or more embodiments of the present invention. To update the PS (380), the PLU (310) sends an RU (402) via the SNA network (330) to the TN3270 server (350). The TN3270 server then converts the SNA data stream into the TN3270 data stream (404). Next, the TN3270 data stream is sent via the TN3270 network (360) to the TN3270 client (370), which updates (406) the PS (380) with the data, and may unlock the keyboard depending on the RU contents.

After completing the update of the PS (432), the PLU (310) sends an EB (408) via the SNA network (330) to the TN3270 server (350). The TN3270 server then converts the SNA data stream into the TN3270 data stream (404), and generates an X'0102' (410). Next, the TN3270 data stream with the X'0102' is sent via the TN3270 network (360) to the TN3270 client (370), which unambiguously indicates to the TN3270 client (370) that the PS (380) is complete and may be modified, and that the keyboard should be unlocked. The command is unambiguous because it can only be generated by the TN3270 server (350).

When the host application attempts to communicate with the SLU after the PS is complete, the host application (340) sends (via the PLU (310)) a BID (414) via the SNA network (330) to the TN3270 server (350) to begin communication. The BID is automatically rejected by the TN3270 server (350).

When the host application (340) sends a SIGNAL (418) via the SNA network (330) to the TN3270 server (350), it is demanding a communication. The TN3270 server (350) converts the 3270 data stream into a local channel non-SNA read modify command (X'06'). The host application, which typically generates an X'F6' for read modify commands, could never generate an X'06', thereby making the source of the command unambiguous to the client (370). The X'06' is sent to the TN3270 client (370) via the TN network (360). Upon receipt of the X'06', the TN3270 client locks the keyboard, stacks the keystrokes of the user, and sends the read modify data stream (424) inbound to the TN3270 server (350). The TN3270 server (350) then sends a CD (426) to the host application (340), allowing the PLU (310) to begin a communication.

After the CD (426) is sent to the host application (340), the host application (340) may once again update the PS (380). To update the PS (380), the PLU (310) sends the RU (402) via the SNA network (330) to the TN3270 server (350). The TN3270 server then converts the SNA data stream into the TN3270 data stream (404). Next, the TN3270 data stream is sent via the TN3270 network (360) to the TN3270 client (370), which updates (406) the PS (380) with the data.

If the PLU (310) sends a CD (428) via the SNA network (330) to the SLU, the TN3270 server (350) translates the CD into an X'0100' (430). The X'0100' is a write command that does not restore the keyboard. The TN3270 server (350) would send this via the TN3270 network (360) to the TN3270 client (370), where the TN3270 client (370) would recognize that the host application (340) has completed its modification (432) of the PS (380). At that point, the PS (380) could be modified, but the state of the keyboard will remain unchanged. If a write type command contained a keyboard restore since the last inbound operation, the keyboard will be unlocked. If a write type command did not contain a keyboard restore since the last inbound operation, the keyboard will be left locked.

In one or more embodiments of the present invention, the invention could be implemented as a software upgrade to a TN3270 server and a TN3270 client.

In various embodiments, there are numerous advantages achieved by implementing aspects of the present invention. One advantage is that no new traffic is generated on the TN3270 network. In addition, the problem of no explicit unlocking of the keyboard for applications migrated from 3270 architecture to TN3270 architecture is obviated. Further, network upgrades with features of the invention are not disruptive to the operation of the network. For example, an X'0102' would be handled by an existing client (i.e., a client operating without the added intelligence of the data stream interpretation code (395) in FIG. 3) in the same manner that a X'F1C2' would be handled, i.e., as a keyboard restore. However, the client is not aware whether the PS is complete. Further, an inventive client (i.e., a client with the added intelligence provided by the data stream interpretation code (395)) would receive and handle a X'F1C2' in the same manner that a X'F1C2' would be handled by an existing (i.e., prior art client), i.e., as a keyboard restore.

While the foregoing is directed to embodiments of the present invention, other and further embodiments of the invention may be devised without departing from the basic scope thereof, and the scope thereof is determined by the claims that follow.

What is claimed is:

1. A secondary logical unit connected to a primary logical unit (PLU) via a Systems Network Architecture (SNA) network, comprising:
    a TN3270 server configured to send a command; and
    a TN3270 client configured to receive the command, wherein the command unambiguously indicates to die TN3270 client that a SNA host application of the PLU has finished building a presentation space of the TN3270 client,
    wherein the command is sent in response to receiving, by the TN3270 server, an end bracket from the SNA application.

2. The secondary logical unit of claim 1, wherein the TN3270 server is configured to send the command in response to receiving one of an end bracket and a change direction from the primary logical unit.

3. The secondary logical unit of claim 2, wherein the SNA host application is configured to send the one of the end bracket and the change direction.

4. The secondary logical unit of claim 1, further comprising an input device and wherein the command unlocks the input device.

5. The secondary logical unit of claim 4, wherein the input device is a keyboard.

6. A system, comprising:
    a primary logical unit (PLU) comprising a Systems Network Architecture (SNA) host application;
    a secondary logical unit (SLU) connected to the PLU by a SNA network, the SLU comprising:
    a TN3270 server configured to send a write command;
    a TN3270 client configured to receive the write command, wherein the write command unambiguously indicates to the TN3270 client that the SNA host application has completed building a presentation space of the TN3270 client; and
    a telnet network connecting the TN3270 server and the TN3270 client,
    wherein the command is sent in response to receiving, by the TN3270 server, an end bracket from the SNA application.

7. The system of claim 6, further comprising an input device, wherein the input device is unlocked in response to the TN3270 client receiving the write command.

8. The system of claim 7, wherein the input device is a keyboard.

9. The system of claim 6, wherein the write command is issued by the TN3270 server in response to receiving, by the TN3270 server, one of an end bracket and a change direction from the SNA host application.

10. The system of claim 9, further comprising an input device, wherein the input device is unlocked in response to the TN3270 client receiving the write command and wherein the write command is issued by the TN3270 server in response to receiving, by the TN3270 server, an end bracket from the SNA host application.

11. In an environment comprising a (i) primary logical unit (PLU) comprising a Systems Network Architecture (SNA) host application, (ii) a secondary logical unit (SLU) and (iii) a SNA network connecting the PLU and SLU, a method, comprising:
    sending, from a TN3270 server of the SLU to a TN3270 client of the SLU, a command which unambiguously indicates to the TN3270 client that the SNA host application has completed building a presentation space of the T3270 client,
    wherein the command is sent in response to receiving, by the TN3270 server, an end bracket from the SNA application.

12. The method of claim 11, further comprising:
    prior to sending the command to the TN3270 client, receiving, by the TN3270 server, an end bracket from the SNA host application; and
    unlocking a keyboard in response to receiving the command by the TN3270 client.

13. The method of claim 12, wherein sending the command is performed in response to receiving, by the TN3270 server, the end bracket.

14. The method of claim 11, wherein the command is a write command.

15. The method of claim 11, further comprising unlocking a keyboard in response to receiving the command by the TN3270 client.

16. The method of claim 11, further comprising, prior to sending the command to the TN3270 client, receiving, by the TN3270 server, one of an end bracket and a change direction from the SNA host application.

17. The method of claim 11, wherein the command is sent in response to receiving, by the TN3270 server, one of an end bracket and a change direction from the SNA host application.

18. A method for sending a command, the method comprising:
a TN3270 server generating a command which unambiguously indicates to a TN3270 client that a Systems Network Architecture (SNA) application has completed building a presentation space in the TN3270 client; and
transmitting the command to the TN3270 client,
wherein the command is sent in response to receiving, by the TN3270 server, an end bracket from the SNA application.

19. The method of claim 1, wherein sending the command comprises sending the command via a telnet network.

20. The method of claim 1, further comprising, prior to sending the command to the TN3270 client, receiving, by the TN3270 server, one of an end bracket and a change direction from the SNA application.

21. The method of claim 1, wherein the command is a write command.

22. The method of claim 1, further comprising unlocking art input device in response to receiving the command by the TN3270 client.

23. The method of claim 1, further comprising unlocking a keyboard in response to receiving the command by the TN3270 client.

24. A method for sending a command, the method comprising:
a TN3270 server generating a command which unambiguously indicates to a TN3270 client that a Systems Network Architecture (SNA) demands ownership of a presentation space of the TN3270 client when the TN3270 server receives a signal from the Systems Network Architecture (SNA) application demanding ownership of a presentation space of the TN3270 client; and
transmitting the command to the TN3270 clients,
wherein the command is sent in response to receiving, by the TN3270 server, an end bracket from the SNA application.

25. The method of claim 24, wherein sending the command comprises transmitting the command via a telnet network.

26. The method of claim 24, wherein the command is a read command.

27. The method of claim 24, further comprising locking an input device in response to receiving the command by the TN3270 client.

28. The method of claim 24, further comprising locking a keyboard in response to receiving the command by the TN3270 client.

* * * * *